United States Patent
Serov et al.

(10) Patent No.: US 9,647,275 B2
(45) Date of Patent: May 9, 2017

(54) BI-FUNCTIONAL CATALYSTS FOR OXYGEN REDUCTION AND OXYGEN EVOLUTION

(71) Applicants: Alexey Serov, Albuquerque, NM (US); Nalin Andersen, Albuquerque, NM (US); Plamen B Atanassov, Santa Fe, NM (US)

(72) Inventors: Alexey Serov, Albuquerque, NM (US); Nalin Andersen, Albuquerque, NM (US); Plamen B Atanassov, Santa Fe, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 14/407,997

(22) PCT Filed: Mar. 15, 2013

(86) PCT No.: PCT/US2013/031917
§ 371 (c)(1),
(2) Date: Dec. 15, 2014

(87) PCT Pub. No.: WO2013/187976
PCT Pub. Date: Dec. 19, 2013

(65) Prior Publication Data
US 2015/0180046 A1      Jun. 25, 2015

Related U.S. Application Data

(60) Provisional application No. 61/659,152, filed on Jun. 13, 2012.

(51) Int. Cl.
*H01M 4/90* (2006.01)
*C01G 15/00* (2006.01)
(Continued)

(52) U.S. Cl.
CPC .......... *H01M 4/9016* (2013.01); *C01G 15/00* (2013.01); *C01G 19/006* (2013.01); *C01G 25/02* (2013.01); *C01G 31/02* (2013.01); *C01G 41/02* (2013.01); *C01G 49/0054* (2013.01); *C01G 51/04* (2013.01); *C01G 51/40* (2013.01); *C01G 53/40* (2013.01); *B01J 21/066* (2013.01); *B01J 23/005* (2013.01); *B01J 23/08* (2013.01); *B01J 23/10* (2013.01); *B01J 23/14* (2013.01);
(Continued)

(58) Field of Classification Search
None
See application file for complete search history.

(56) References Cited

U.S. PATENT DOCUMENTS

| | | | | |
|---|---|---|---|---|
| 2008/0312073 | A1* | 12/2008 | Olson | B01J 31/06 502/164 |
| 2012/0219735 | A1* | 8/2012 | Bakker | C23C 18/1648 428/34.1 |

FOREIGN PATENT DOCUMENTS

WO     WO 2010093909 A1 *   8/2010   .............. B01J 13/02

OTHER PUBLICATIONS

Yue et al (Synthesis of Porous Single Crystals of Metal Oxide via Solid-Liquid Route, Chem Mater. 2007, 19, 2359-2363).*

* cited by examiner

*Primary Examiner* — Melvin C Mayes
*Assistant Examiner* — Michael Forrest
(74) *Attorney, Agent, or Firm* — Gonzales Patent Services; Ellen M. Gonzales

(57) ABSTRACT

A porous metal-oxide composite particle suitable for use as a oxygen reduction reaction or oxygen evolution reaction catalyst and sacrificial support based methods for making the same.

20 Claims, 2 Drawing Sheets

(51) Int. Cl.
*C01G 49/00* (2006.01)
*C01G 41/02* (2006.01)
*C01G 25/02* (2006.01)
*C01G 51/04* (2006.01)
*C01G 53/00* (2006.01)
*C01G 19/00* (2006.01)
*C01G 31/02* (2006.01)
*C01G 51/00* (2006.01)
*B01J 23/14* (2006.01)
*B01J 23/18* (2006.01)
*B01J 25/00* (2006.01)
*B01J 37/00* (2006.01)
*B01J 23/75* (2006.01)
*B01J 23/20* (2006.01)
*B01J 23/10* (2006.01)
*B01J 23/08* (2006.01)
*B01J 23/06* (2006.01)
*B01J 23/00* (2006.01)
*B01J 23/30* (2006.01)
*B01J 23/83* (2006.01)
*B01J 23/847* (2006.01)
*B01J 21/06* (2006.01)
*B01J 35/00* (2006.01)
*B01J 37/06* (2006.01)

(52) U.S. Cl.
CPC ............... *B01J 23/18* (2013.01); *B01J 23/20* (2013.01); *B01J 23/30* (2013.01); *B01J 23/75* (2013.01); *B01J 23/83* (2013.01); *B01J 23/8476* (2013.01); *B01J 25/00* (2013.01); *B01J 35/0033* (2013.01); *B01J 37/0018* (2013.01); *B01J 37/06* (2013.01); *C01P 2006/40* (2013.01)

BI-FUNCTIONAL CATALYSTS FOR OXYGEN REDUCTION AND OXYGEN EVOLUTION

CROSS-REFERENCE TO RELATED APPLICATIONS

The following application claims benefit of U.S. Provisional Application No. 61/659152, filed Jun. 13, 2012, which is hereby incorporated by reference in its entirety.

BACKGROUND

Fuel cells are receiving increasing attention as a viable energy-alternative. In general, fuel cells convert electrochemical energy into electrical energy in an environmentally clean and efficient manner, typically via an oxygen reduction reaction (ORR). Fuel cells are contemplated as potential energy sources for everything from small electronics to cars and homes. In order to meet different energy requirements, there are a number of different types of fuel cells in existence today, each with varying chemistries, requirements, and uses.

As one example, Direct Methanol Fuel Cells (DMFCs) rely upon the oxidation of methanol on an electrocatalyst layer to form carbon dioxide. Water is consumed at the anode and produced at the cathode. Positive ions (H+) are transported across a proton exchange membrane to the cathode where they react with oxygen to produce water. Electrons can then be transported via an external circuit from anode to cathode providing power to external sources.

As another example, polymer electrolyte membrane (PEM) fuel cells (also called proton exchange membrane fuel cells) use pure hydrogen (typically supplied by a hydrogen tank) as a fuel. A stream of hydrogen is delivered to the anode side of a membrane-electrode assembly (MEA), where it is catalytically split into protons and electrons. As with the DMFC, the positive ions are transported across a proton exchange membrane to the cathode where they react with oxygen to produce water.

Regenerative fuel cells run in reverse mode. For example, as described above, PEM fuel cells use hydrogen and oxygen to produce water and electricity using an ORR catalyst. Run in reverse mode, the fuel cell uses an Oxygen Evolution Reaction (OER) catalyst to use water and electricity to produce hydrogen and water. An external voltage is applied and water at the cathode side of the fuel cell undergoes electrolysis to form hydrogen and oxide ions which are transported through the electrolyte to the anode where they are oxidized to form oxygen. In OER mode, the polarity of the cell is the opposite of that for the ORR mode.

Currently, one of the limiting factors in the wide scale commercialization of both ORR and OER is the cost associated with the precious metals that are used to produce effective catalysts. Both DMFC and PEM fuel cells commonly use platinum as an electrocatalyst, while regenerative fuel cells often use iridium oxide or other rare platinum-family oxides in the coating of anode-electrodes for electrolysis.

Transition metal-oxide systems are known catalysts for both ORR and OER. Previously described methods of forming transition metal-oxide catalysts typically involve pyrolyzing salts of the desirable metals to obtain solid particles of the desired metals, which are then milled to make a powder. It is of particular note that this method will only form solid particles and that porous particles cannot be formed using this methodology. However, previously described transition metal-oxide systems possess a number of disadvantages including low stability in alkaline media, low activity compared to conventional ORR/OER catalysts (i.e., platinum/iridium oxide), low surface area etc.

Accordingly, novel, inexpensive methods of producing stable ORR and OER catalysts with sufficient activity suitable for commercial fuel cell use are desired.

SUMMARY

In the present disclosure, a method of preparing composite metal oxide catalytic materials utilizing a sacrificial support approach and using inexpensive and readily available nitrate and/or chloride precursors is described. The catalytic materials synthesized using this approach perform well in alkaline and neutral media, are highly durable, inexpensive to manufacture, and suitable for use in both traditional and regenerative fuel cells.

DETAILED DESCRIPTION

Figure 1:
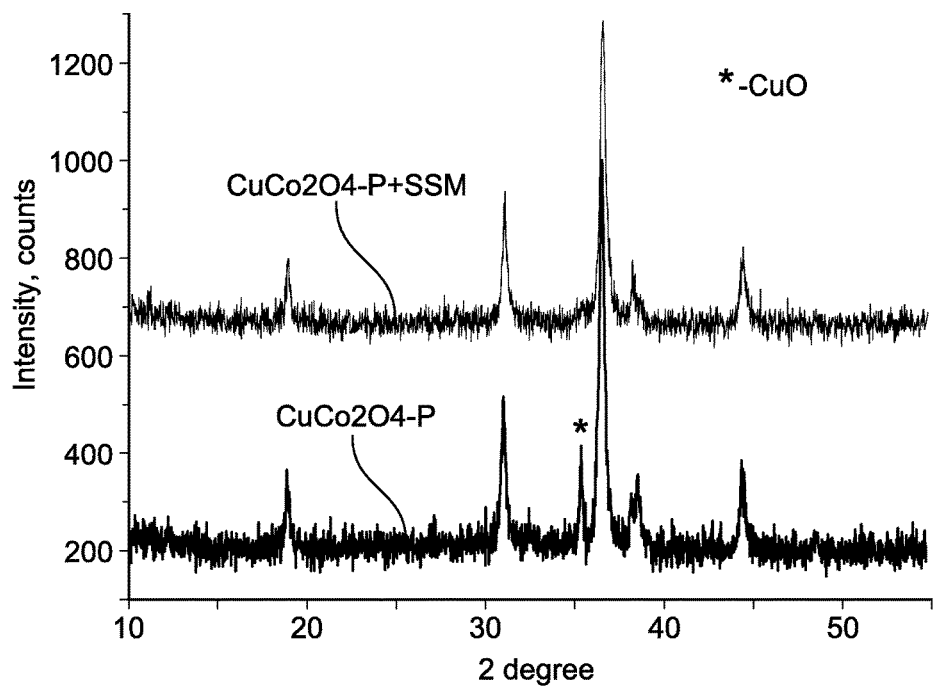
FIG. 1 shows XRD data of a $CuCo_2O_4$ catalysts prepared by conventional methods (Pechinni—P), and the modified Pechinni Sacrificial Support Method (PSSM) illustrating that the PSSM method results in phase pure material—$CuCo_2O_4$.

The present disclosure provides novel materials and methods for making the same. According to various embodiments, the present disclosure provides a porous metal-oxide composite and methods for making the same. The porous metal-oxide composite is suitable for use in or as a catalyst in a fuel cell and is able to catalyze both ORR and OER reactions.

For the sake of clarity, in the present application the term "catalyst" is used to refer to a final product, suitable for use, for example, in a fuel cell, which has catalytic activity. The catalyst may include multiple types of materials, some of which may not in themselves have catalytic activity (for example, supporting material.) The term "catalytic material" is any material which has catalytic activity either on its own or as part of a catalyst.

According to the various embodiments described in greater detail below, a porous metal-oxide material is formed by depositing metal oxide precursors onto the surface of a sacrificial support, performing a chemical reaction to transform the precursors into their metal-oxide products, thereby forming a metal oxide coated sacrificial support, and then removing the sacrificial support to produce a porous metal oxide composite material. According to some embodiments, the precursors may be transition metal nitrite or chloride precursors.

If the desired end-product is to be used as a catalyst, it may be desirable for the metal in the composite to be a transition metal. Accordingly, most of the following discussion is related to methods and materials using transition metals and their precursors. Examples of suitable transition metals include Ce, Cr, Cu, Fe, Mo, Ni, Ru, Ta, Ti, V, W, and Zr. Exemplary transition metal precursors include, but are not limited to, any soluble transition metal salts, for example: cerium nitrate, chromium nitrate, copper nitrate, ammonium molybdate, iron nitrate, iron chloride, nickel nitrate, ruthenium chloride, tantalum isopropoxide, titanium ethoxide, vanadium sulfate, ammonium tunstanate and zirconium nitrate. However, it will be understood that the methods described herein may be suitable for use with non-transition metals and their precursors in order to form porous metal-oxide composites with other types of metals and thus, the methods and materials described herein are not intended to be limited solely to transition metals and their precursors.

According to a first method, the porous metal-oxide composites are formed using a modified Pecchini synthesis method. (See U.S. Pat. No. 3,330,697.) One or more transition metal precursors in the form of a metal nitrate or chloride are mixed with a salt that will melt without decomposition. Examples of suitable metal nitrates and metal chlorides include, but are not limited to, cobalt nitrate, zirconium oxynitrate hydrate, indium chloride tetrahydrate, venadyl sulfate hydrate, praseodymium nitrate hexahydrate, tin chloride pentahydrate, cerium nitrate hexahydrate, iron nitrate nonhydrate, yttrium nitrate hexahydrate, ammonium tungstate, niobium chloride, antimony chloride, neodymium nitrate hexahydrate, nickel nitrate hexahydrate and tantalum ethoxide. Suitable salts include, but are not limited to, sodium nitrate and potassium nitrate.

A colloidal suspension of a sacrificial support such as silica is then added to the mixture. According to an embodiment, the colloidal suspension may be formed by dispersing silica (or another sacrificial material) in an aqueous solution such as deionized water using a high power ultrasound probe. The sacrificial support-containing solution is dried to allow the resulting solution to evaporate, thereby producing a dry resin comprising metal-oxide coated sacrificial particles. The resin is then ground and heat treated at a sufficient temperature. According to various embodiments the resin may be ground by ball milling or mortar and pestle, or any other suitable method. Heat treatment is typically performed by calcination, which may be performed, for example, isothermally in a box furnace. Specific temperatures for various end-products are provided in the Examples section below, but in general calcination may be performed between 150 and 1000° C. According to some embodiments, the resin may be heated at a specific rate and annealed at this temperature. The furnace may then be cooled to room temperature and the calcined sample removed and ground again. The sacrificial support is then removed, typically by chemical etching. It is important that the removal method used not harm the oxide materials. Accordingly KOH or NaOH, as opposed to HF or other very aggressive acids, are recommended for use as etchants. The final composite material is achieved by washing the etched material until a neutral pH is reached, drying the material (for example at 55-85° C. for 24-48 hours) and then grinding to the desired particle size.

According to yet another method, referred to herein as the "double heat-treatment method," a colloidal suspension is formed from a solution of sucrose, urea (or another pore forming agent), and a sacrificial support. An aqueous solution containing dissolved transition metal precursors is then added to the colloidal suspension, which is dried at a temperature of between 45 and 85° C. to evaporate the resulting solution and produce a dry resin. The resin is then ground and pyrolyzed (first heat treatment) at a suitable temperature (typically between 150 and 1000° C.) Pyrolyzation typically takes place in an inert atmosphere such as $N_2$, Ar, or He. The sample is then cooled to room temperature and then ground and calcined (second heat treatment) in an oxygen environment at a suitable temperature (typically between 150 and 1000° C.) The sacrificial support is then removed, typically by chemical etching. Again, KOH or NaOH, as opposed to HF or other very aggressive acids, are recommended for use as etchants, so as not to harm the oxide material. The final composite material is achieved by washing the etched material until a neutral pH is reached, drying the material (for example at 55-85° C. for 24-48 hours) and then grinding to the desired particle size.

Both methods described above utilize a sacrificial support to achieve the final porous material. It will be appreciated that the sacrificial support may be synthesized and infused in a single synthesis step or the sacrificial support may be synthesized first (or otherwise obtained) and then infused with the appropriate precursors. Suitable sacrificial supports include, but are not limited to silicas, zeolites, aluminas, and the like.

It should be appreciated that the size and shape of the sacrificial particles may be selected according to the desired shape(s) and size(s) of the voids within the resulting material. Accordingly, by selecting the particular size and shape of sacrificial particles, one can produce catalytic material having voids of a predictable size and shape. For example, if the sacrifical particles are spheres, the resulting material will contain a plurality of spherical voids. Those of skill in the art will be familiar with the electrocatalyst Pt—Ru black, which consists of a plurality of platinum-ruthenium alloy spheres. An electrocatalyst formed from using sacrificial spheres with the above-described method looks like a negative image of the Pt—Ru black; the space that existed as a void in the Pt—Ru black is filled with metal electrocatalyst, and the space that existed as metal electrocatalyst in the Pt—Ru black is void.

Accordingly, the support may take the form of spheres, particles, or other two or three dimensional regular, irregular, or amorphous shapes. The spheres, particles, or other shapes may be monodisperse, or irregularly sized. As described below, the spheres, particles, or other shapes may or may not have pores and such pores may be of the same or different sizes and shapes.

According to a further embodiment, mesoporous sacrificial supports, such as mesoporous silica, can be used. In this case the templating involves intercalating the mesopores of the sacrificial material and results in a self-supported electrocatalysts with porosity in the 2-20 nm range. In one particular embodiment, the sacrificial template is Cabosil amorphous fumed silica (325 $m^2/g$). As stated above, because the spheres serve as the template for the formation of the electrocatalyst, in an embodiment where silica particles having an average diameter of 20 nm is used, the spherical voids in the electrocatalyst will typically have a diameter of approximately 20 nm. Those of skill in the art will be familiar with a variety of silica particles that are commercially available, and such particles may be used. Alternatively, known methods of forming silica particles may be employed in order to obtain particles of the desired shape and/or size.

As stated above, according to some embodiments, particles of any diameter may be used. In some preferred embodiments, particles having a characteristic length of between 1 nm and 100 nm, in more preferred embodiments, particles having characteristic lengths of between 100 nm and 1000 nm may be used and in other preferred embodiments, particles having an characteristic lengths of between 1 mm and 10 mm may be used.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

REFERENCES

[1] M. H. Robson, A. Serov, K. Artyushkova, P. Atanassov "A Mechanistic Study of 4-Aminoantipyrine and Iron Derived Non-Platinum Group Metal Catalyst on the Oxygen Reduction Reaction" Electrochim Acta, 90 (2013) Pages 656-665

[2] S. Brocato, A. Serov, P. Atanassov "pH Dependence of Catalytic Activity for ORR of the non-PGM Catalyst Derived from Heat-Treated Fe-Phenanthroline" Electrochim. Acta, 87 (2013) 361-365

[3] A. Serov, M. H. Robson, K. Artyushkova, P. Atanassov "Templated non-PGM cathode catalysts derived from iron and poly(ethyleneimine) precursors" Appl. Catal. B 127 (2012) 300-306.

[4] A. Serov, M. H. Robson, M. Smolnik, P. Atanassov "Templated bi-metallic non-PGM catalysts for oxygen reduction" Electrochim Acta 80 (2012) 213-218.

[5] A. Serov, U. Martinez, A. Falase, P. Atanassov "Highly Active Pd—Cu Catalysts for Electrooxidation of 2-Propanol" Electrochem. Comm. 22 (2012) 193-196.

[6] A. Serov, M. H. Robson, B. Halevi, K. Artyushkova, P. Atanassov "Highly Active and Durable Templated Non-PGM Cathode Catalysts Derived from Iron and Aminoantipyrine" Electrochem. Comm 22 (2012) 53-56.

Additional information may be gathered from the Examples section below.

EXAMPLES

Synthesis of Co—Cu—O Material 16.4 g of cobalt nitrate and 21.4 g of copper nitrate dissolve in 345 ml of water. 18.5 g of silica is added to solution and dispersed using ultrasound bath. Mixture allows to dry at T=85 C for 48 hours. As prepared dry composite materials is ground and heat treated at air at T=525 C. The silica is removed by 7M KOH for 24 hours. As results high surface area mixed-oxide washed by DI water until neutral reaction and dried at T=85 C for 24 hours.

FIG. 1 illustrates XRD data for selected porous cupper-cobalt catalyst prepared by the above-described methods compared to the conventional Pechinni method. It will be appreciated that the mixed oxide catalysts disclosed herein possess high activity in ORR/OER in alkaline and neutral as well as stability and durability and can be used in fuel cell, electrolyzers and batteries systems. Furthermore, the disclosed catalysts possess high electroconductivity due to their optimal composition.

Figure 2:
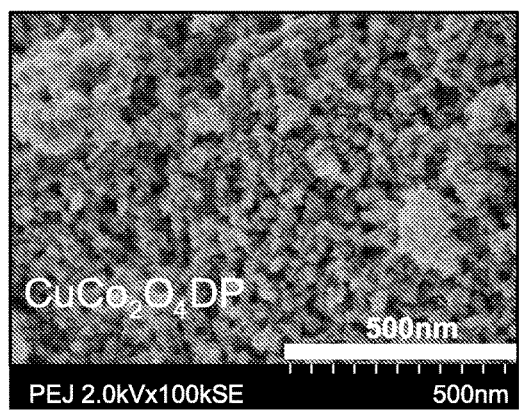
FIG. 2 is an SEM image of a $CuCo_2O_4$ catalyst prepared by a double heat treatment method.
Figure 3:
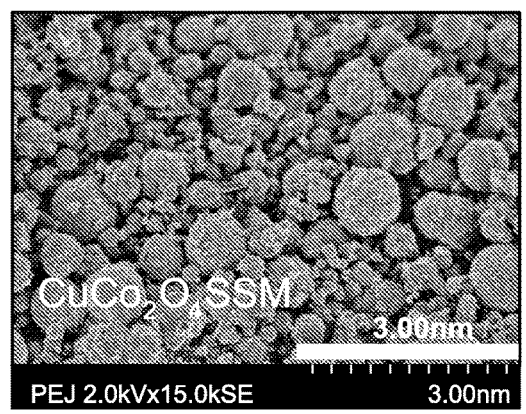
FIG. 3 is an SEM image of a CuCo2O4 catalyst prepared by a sacrificial support-based method illustrating that the method results in spherical, high surface area and porous structures.
Figure 4:
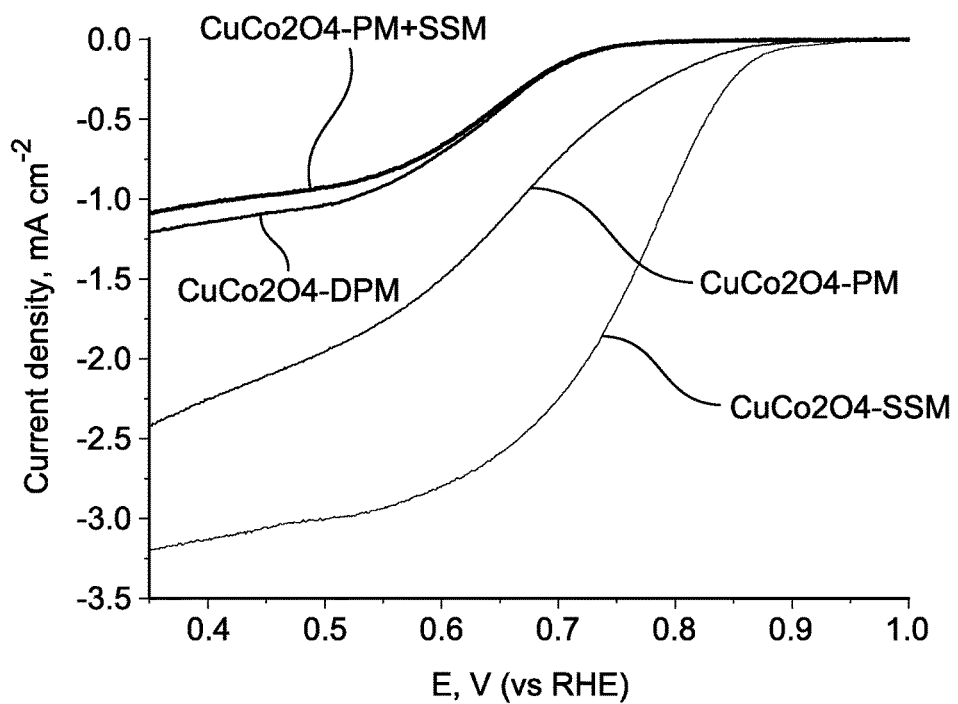
FIG. 4 is a Rotating Disc Electrode electro-voltamogram illustrating oxygen reduction for a $CuCo_2O_4$ catalysts prepared by different methods in 1M KOH saturated with $O_2$ (catalyst loading: 200 µg $cm^{-2}$, 1200 RPM, 5 mV $s^{-1}$).
Figure 5:
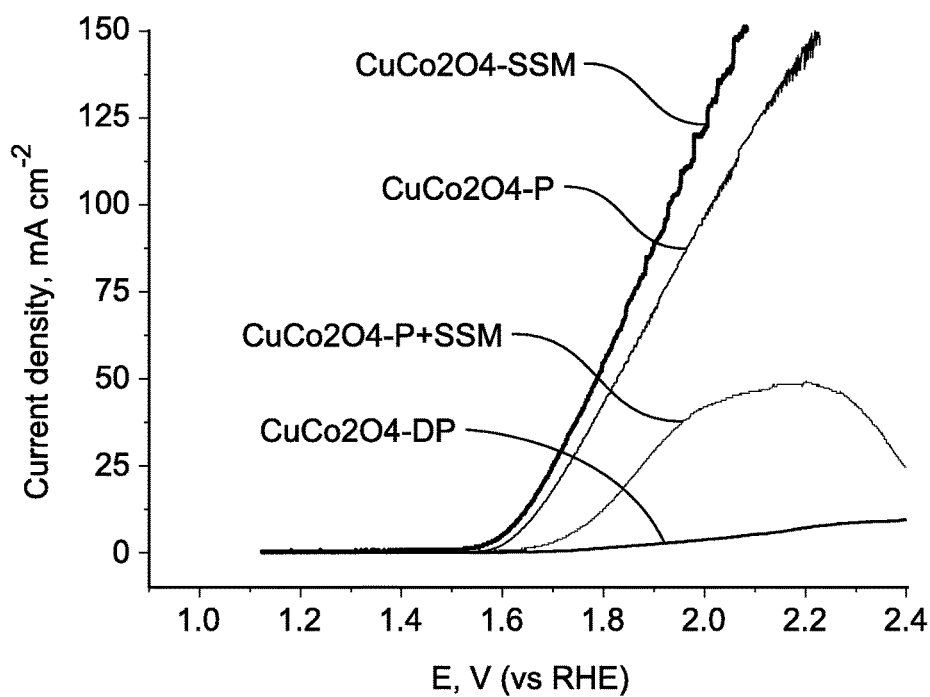
FIG. 5 is a Rotating Disc Electrode electro-voltamogram illustrating oxygen evolution for a $CuCo_2O_4$ catalysts prepared by different methods in 1M KOH saturated with $N_2$ (catalyst loading: 200 µg $cm^{-2}$, 1200 RPM, 5mV $s^{-1}$).

FIGS. 2 and 3 illustrate the morphological advantages of the SSM method. The utility of these materials is illustrated in oxygen reduction/evolution tests, illustrated in FIGS. 4 and 5.

These reaction tests demonstrate that mixed oxides catalysts prepared from copper and cobalt precursors using the method described possess high activity in alkaline and neutral medias. Thus, Cu—Co—O catalysts formed using this method are effective catalysts for oxygen reduction and evolution.

Synthesis of $Co_3O_4$ 26.8 g of cobalt nitrate dissolves in 145 ml of water. 8.5 g of silica is added to solution and dispersed using ultrasound bath. Mixture allows to dry at T=85 C for 48 hours. As prepared dry composite materials is ground and heat treated at air at T=525 C. The silica is removed by 7M KOH for 24 hours. As results high surface area oxide washed by DI water until neutral reaction and dried at T=85 C for 24 hours.

Synthesis of $ZrO_2$ 52.8 g of zirconium oxynitrate hydrate dissolves in 450 ml of water. 34.7 g of silica is added to solution and dispersed using ultrasound bath. Mixture allows to dry at T=50 C for 4 hours, then T=85 for 24 hours. As prepared dry composite materials is ground and heat treated at air at T=895 C. The silica is removed by 4M KOH for 48 hours. As results high surface area oxide washed by DI water until neutral reaction and dried at T=85 C for 48 hours.

Synthesis of $In_2O_3$ 47.56 g of indium chloride tetrahydrate dissolves in 126 ml of water. 8.2 g of silica is added to solution and dispersed using ultrasound bath. Mixture allows to dry at T=85 for 24 hours. As prepared dry composite materials is ground and heat treated at air at T=375 C. The silica is removed by 6M KOH for 24 hours. As results high surface area oxide washed by DI water until neutral reaction and dried at T=65 C for 48 hours.

Synthesis of $V_2O_5$ 88.2 g of vanadyl sulfate hydrate dissolves in 1140 ml of water. 240.5 g of silica is added to solution and dispersed using ultrasound bath. Mixture allows to dry at T=85 for 48 hours. As prepared dry composite materials is ground and heat treated at air at T=5950 C. The silica is removed by 10M KOH for 12 hours. As results high surface area oxide washed by DI water until neutral reaction and dried at T=85 C for 24 hours.

Synthesis of Pr$_2$O3—SnO$_2$ 16.8 g of praseodymium nitrate hexahydrate and 11.54 g tin chloride pentahydrate dissolves in 56.3 ml of water. 5.28 g of silica is added to solution and dispersed using ultrasound bath. Mixture allows to dry at T=75 for 24 hours. As prepared dry composite materials is ground and heat treated at air at T=975 C. The silica is removed by 2M KOH for 96 hours. As results high surface area oxide washed by DI water until neutral reaction and dried at T=65 C for 48 hours.

Synthesis of CeO$_2$—Fe$_2$O$_3$—Y$_2$O$_3$ 54.3 g of cerium nitrate hexahydrate, 17.8 g iron nitrate nonahydrate, and 2.2 g yttrium nitrate hexahydrate dissolves in 1023.5 ml of water. 14.8 g of silica is added to solution and dispersed using ultrasound bath. Mixture allows to dry at T=75 for 28 hours. As prepared dry composite materials is ground and heat treated at air at T=1000 C. The silica is removed by 6M KOH for 24 hours. As results high surface area oxide washed by DI water until neutral reaction and dried at T=85 C for 24 hours.

Synthesis of WO$_3$ 34.3 g of ammonium tungstate dissolves in 54.9 ml of water. 13.9 g of silica is added to solution and dispersed using ultrasound bath. Mixture allows to dry at T=65 for 24 hours. As prepared dry composite materials is ground and heat treated at air at T=670 C. The silica is removed by 7M KOH for 24 hours. As results high surface area oxide washed by DI water until neutral reaction and dried at T=45 C for 48 hours.

Synthesis of Nb$_2$O$_5$ 33.7 g of niobium chloride dissolves in 39.7 ml of water. 16.5 g of silica is added to solution and dispersed using ultrasound bath. Mixture allows to dry at T=80 for 24 hours. As prepared dry composite materials is ground and heat treated at air at T=800 C. The silica is removed by 3M KOH for 96 hours. As results high surface area oxide washed by DI water until neutral reaction and dried at T=65 C for 24 hours.

Synthesis of Sb$_2$O$_3$ 12.9 g of antimony chloride dissolves in 460.6 ml of water. 3.8 g of silica is added to solution and dispersed using ultrasound bath. Mixture allows to dry at T=85 for 24 hours. As prepared dry composite materials is ground and heat treated at air at T=825 C. The silica is removed by 9M KOH for 15 hours. As results high surface area oxide washed by DI water until neutral reaction and dried at T=50 C for 24 hours.

Synthesis of Nd$_2$O$_3$ 1.34 g of neodymium nitrate hexahydrate dissolves in 23.2 ml of water. 0.5 g of silica is added to solution and dispersed using ultrasound bath. Mixture allows to dry at T=85 for 24 hours. As prepared dry composite materials is ground and heat treated at air at T=750 C. The silica is removed by 7M KOH for 24 hours. As results high surface area oxide washed by DI water until neutral reaction and dried at T=55 C for 48 hours.

Synthesis of NiO—Ta$_2$O$_5$ 18.2 g of nickel nitrate hexahydrate and 29.3 g tantalum ethoxide dissolves in 188.9 ml of water. 18.5 g of silica is added to solution and dispersed using ultrasound bath. Mixture allows to dry at T=70 for 24 hours. As prepared dry composite materials is ground and heat treated at air at T=825 C. The silica is removed by 10M KOH for 17 hours. As results high surface area oxide washed by DI water until neutral reaction and dried at T=45 C for 48 hours.

What is claimed is:

1. A method for forming a porous metal oxide material comprising:
   providing a solution comprising a plurality of dispersed sacrificial template particles;
   reacting one or more metal oxide precursors onto the dispersed sacrificial template particles to produce coated template particles;
   pyrolyzing and calcining the coated template particles; and
   removing the sacrificial template particles to produce a highly dispersed, self-supported, high surface area electrocatalytic material.

2. The method of claim 1 wherein the metal in the metal oxide is a transition metal.

3. The method of claim 1 wherein at least one of the metal oxide precursors is a metal citrate or metal nitrate.

4. The method of claim 1 wherein the step of reacting one or more metal oxide precursors onto the sacrificial template particles comprises mixing a colloidal suspension of template particles with a solution containing a transition metal citrate or nitrate and sodium nitrate.

5. The method of claim 4 wherein the step of heat treating the coated template particles further comprises calcination.

6. The method of claim 4 wherein the colloidal suspension comprises sucrose and urea.

7. The method of claim 1 wherein the step of removing the sacrificial template particles comprises chemical etching.

8. The method of claim 1 wherein the chemical etchant is HF.

9. The method of claim 1 wherein the metal oxide precursor is selected from the group consisting of cobalt nitrate, zirconium oxynitrate hydrate, indium chloride tetrahydrate, venadyl sulfate hydrate, praseodymium nitrate hexahydrate, tin chloride pentahydrate, cerium nitrate hexahydrate, iron nitrate nonhydrate, yttrium nitrate hexahydrate, ammonium tungstate, niobium chloride, antimony chloride, neodymium nitrate hexahydrate, nickel nitrate hexahydrate and tantalum ethoxide.

10. The method of claim 2 wherein the transition metal is selected from the group consisting of Ce, Cr, Cu, Fe, Mo, Ni, Ru, Ta, Ti, V, W, and Zr.

11. The method of claim 4 wherein the colloidal suspension comprises a pore forming agent.

12. The method of claim 1 wherein the sacrificial template particles are non-porous.

13. The method of claim 12 wherein the sacrificial template particles are fumed silica.

14. A method for forming a porous metal oxide material comprising:
   providing a solution comprising a plurality of dispersed sacrificial template particles;

reacting one or more metal oxide precursors onto the dispersed sacrificial template particles by mixing a colloidal suspension of template particles with a solution containing a transition metal citrate or nitrate and sodium nitrate to produce coated template particles;

heat treating the coated template particles; and removing the sacrificial template particles to produce a highly dispersed, self-supported, high surface area electrocatalytic material.

15. The method of claim 14 wherein the step of heat treating the coated template particles comprises pyrolyzation and calcination.

16. The method of claim 14 wherein the colloidal suspension comprises sucrose and urea.

17. The method of claim 14 wherein the metal in the metal oxide is a transition metal.

18. The method of claim 17 wherein the transition metal is selected from the group consisting of Ce, Cr, Cu, Fe, Mo, Ni, Ru, Ta, Ti, V, W, and Zr.

19. The method of claim 14 wherein the colloidal suspension comprises a pore forming agent.

20. The method of claim 14 wherein the sacrificial template particles are non-porous.

\* \* \* \* \*